United States Patent
Danilov et al.

(10) Patent No.: US 11,323,497 B2
(45) Date of Patent: May 3, 2022

(54) EXPIRATION OF DATA STREAMS FOR APPLICATION PROGRAMS IN A STREAMING DATA STORAGE PLATFORM

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/064,747

(22) Filed: Oct. 7, 2020

(65) Prior Publication Data
US 2022/0109710 A1 Apr. 7, 2022

(51) Int. Cl.
*H04L 29/06* (2006.01)
*H04L 65/61* (2022.01)
*H04L 67/306* (2022.01)

(52) U.S. Cl.
CPC ........ *H04L 65/4069* (2013.01); *H04L 67/306* (2013.01)

(58) Field of Classification Search
CPC ..... H04L 65/4069; H04L 67/306; G06F 9/48; G06F 9/542
(Continued)

(56) References Cited

U.S. PATENT DOCUMENTS 3,617,587 A 11/1971 Nayar et al.
5,826,977 A 10/1998 Fowler et al.
(Continued)

FOREIGN PATENT DOCUMENTS

CA 2672879 4/2008
CN 1708029 12/2005
(Continued)

OTHER PUBLICATIONS

Notice of Allowance dated Jun. 28, 2021 for U.S. Appl. No. 16/884,647, 39 pages.
(Continued)

*Primary Examiner* — Glenford J Madamba
(74) *Attorney, Agent, or Firm* — Amin, Turocy & Watson, LLP

(57) ABSTRACT

The described technology is generally directed towards a streaming data storage system that provides different views of a data stream to different applications based on a per-application data expiration policy. Applications that have different needs related to data lifetime management can be registered to read the same data stream, with each application individually assigned a data expiration time period. When one registered application reads the data stream, that application is presented with a view of the data stream that is subject to that application's expiration time period. When another registered application with a different expiration time period reads the same data stream, the other application is presented with a different view, according to that other application's expiration time period. The time periods for a registered application can be set between a minimum expiration period and a maximum expiration period, or set to a default value between the minimum and maximum.

20 Claims, 14 Drawing Sheets

(58) Field of Classification Search
USPC .......................................................... 709/219
See application file for complete search history.

(56) References Cited

U.S. PATENT DOCUMENTS

| | | | |
|---|---|---|---|
| 8,572,091 | B1 | 10/2013 | Sivasubramanian et al. |
| 8,825,848 | B1 | 9/2014 | Dotan et al. |
| 9,514,018 | B2 | 12/2016 | Sikri |
| 9,639,589 | B1 | 5/2017 | Theimer et al. |
| 9,898,482 | B1 | 2/2018 | Bono |
| 9,965,215 | B1 | 5/2018 | Vazhenin et al. |
| 10,860,457 | B1 | 12/2020 | Evenson et al. |
| 11,016,826 | B2 | 5/2021 | Lehmann |
| 11,194,638 | B1 | 12/2021 | Danilov et al. |
| 2007/0220518 | A1 | 9/2007 | Verbowski et al. |
| 2008/0184262 | A1 | 7/2008 | Ginis et al. |
| 2008/0301135 | A1 | 12/2008 | Alves et al. |
| 2011/0126099 | A1 | 5/2011 | Anderson et al. |
| 2011/0131588 | A1 | 6/2011 | Allam et al. |
| 2011/0249147 | A1 | 10/2011 | Ishii |
| 2012/0102503 | A1 | 4/2012 | Meijer et al. |
| 2012/0109985 | A1 | 5/2012 | Chandrasekaran |
| 2013/0226931 | A1 | 8/2013 | Hazel et al. |
| 2015/0169449 | A1 | 6/2015 | Barrell et al. |
| 2015/0172120 | A1 | 6/2015 | Dwarampudi et al. |
| 2015/0341212 | A1 | 11/2015 | Hsiao et al. |
| 2015/0363245 | A1 | 12/2015 | Mutschler |
| 2016/0063080 | A1 | 3/2016 | Nano et al. |
| 2016/0210061 | A1 | 7/2016 | Soncodi et al. |
| 2016/0337435 | A1 | 11/2016 | Nigam et al. |
| 2017/0075832 | A1 | 3/2017 | Bhimani et al. |
| 2017/0075947 | A1 | 3/2017 | Kurilov et al. |
| 2017/0212891 | A1 | 7/2017 | Pundir et al. |
| 2018/0121307 | A1 | 5/2018 | Braun et al. |
| 2018/0176244 | A1 | 6/2018 | Gervais et al. |
| 2018/0184138 | A1 | 6/2018 | Shaw et al. |
| 2018/0332325 | A1 | 11/2018 | Kaitchuck |
| 2018/0332366 | A1 | 11/2018 | Paduroiu |
| 2018/0332367 | A1 | 11/2018 | Kaitchuck et al. |
| 2018/0336256 | A1 | 11/2018 | Li et al. |
| 2019/0026301 | A1 | 1/2019 | Wang et al. |
| 2019/0138494 | A1 | 5/2019 | Inoue |
| 2020/0034468 | A1 | 1/2020 | Lei et al. |
| 2020/0174695 | A1 | 6/2020 | Bazarsky et al. |
| 2020/0250172 | A1 | 8/2020 | Busjaeger et al. |
| 2020/0320005 | A1 | 10/2020 | Shulman et al. |
| 2020/0394196 | A1 | 12/2020 | Shivanna et al. |
| 2020/0404011 | A1 | 12/2020 | Gervais et al. |
| 2021/0110328 | A1 | 4/2021 | Hsiao et al. |
| 2021/0124746 | A1 | 4/2021 | Klaedtke |
| 2021/0256029 | A1* | 8/2021 | Danilov ............... G06F 16/254 |
| 2021/0342296 | A1* | 11/2021 | Danilov ............ G06F 16/24568 |
| 2021/0342354 | A1* | 11/2021 | Danilov ............ G06F 16/24568 |
| 2021/0365211 | A1 | 11/2021 | Danilov et al. |

FOREIGN PATENT DOCUMENTS

| | | |
|---|---|---|
| CN | 104901958 | 9/2015 |
| CN | 105591926 | 5/2016 |
| GB | 2377038 | 12/2002 |

OTHER PUBLICATIONS

Office Action dated Jun. 29, 2021 for U.S. Appl. No. 16/881,556, 24 pages.
Akidau et al., "MillWheel: Fault-Tolerant Stream Processing at Internet Scale" Proceedings of the VLDB Endowment, vol. 6, No. 11, 2013, 12 pages.
Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.
"Execution Model" [https://beam.apache.org/documentation/runtime/model/]. The Apache Software Foundation. Retrieved Aug. 26, 2020, 5 pages.
"Apache Beam Programming Guide" [https://beam.apache.org/documentation/programming-guide/]. The Apache Software Foundation. Retrieved Aug. 26, 2020, 69 pages.
"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.
"What is Apache Flink?—Architecture" [https://flink.apache.org/flink-architecture.html]. The Apache Software Foundation. Copyright 2014-2019, retrieved Aug. 26, 2020, 3 pages.
"Stateful Function—Event-driven Application on Apache Flink" [https://flink.apache.org/stateful-functions.html]. The Apache Software Foundation. Copyright 2014-2019, retrieved Aug. 26, 2020, 8 pages.
"What is Apache Flink?—Operations" [https://flink.apache.org/flink-operations.html]. The Apache Software Foundation. Copyright 2014-2019, retrieved Aug. 26, 2020, 3 pages.
"Use Cases" [https://flink.apache.org/usecases.html]. The Apache Software Foundation. Copyright 2014-2019, retrieved Aug. 26, 2020, 5 pages.
"Introduction" [http://kafka.apache.org/intro]. The Apache Software Foundation. Copyright 2017, retrieved Aug. 26, 2020, 6 pages.
"Apache Kafka Quickstart" [http://kafka.apache.org/quickstart]. The Apache Software Foundation. Copyright 2017, retrieved Aug. 26, 2020, 6 pages.
"Use Cases" [http://kafka.apache.org/uses]. The Apache Software Foundation. Retrieved Aug. 26, 2020, 3 pages.
"Architecture Overview" [pulsar.apache.org/docs/en/concepts-architecture-overview/]. The Apache Software Foundation. Copyright 2020, retrieved Aug. 26, 2020, 11 pages.
"Messaging" [pulsar.apache.org/docs/en/concepts-messaging/]. The Apache Software Foundation. Copyright 2020, retrieved Aug. 26, 2020, 32 pages.
"Pulsar Overview" [pulsar.apache.org/docs/en/concepts-overview/]. The Apache Software Foundation. Copyright 2020, retrieved Aug. 26, 2020, 2 pages.
Office Action dated Jan. 29, 2021 for U.S. Appl. No. 16/256,083, 42 pages.
Notice of Allowance dated Aug. 4, 2021 for U.S. Appl. No. 17/200,652, 51 pages.
Office Action dated Oct. 1, 2021 for U.S. Appl. No. 16/915,762, 57 pages.
Office Action dated Oct. 1, 2021 for U.S. Appl. No. 17/127,724, 41 pages.
Office Action dated Nov. 10, 2021 for U.S. Appl. No. 16/944,089, 75 pages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Office Action dated Jan. 21, 2022 for U.S. Appl. No. 16/864,892, 26 pgs.
Notice of Allowance dated Feb. 24, 2022 for U.S. Appl. No. 17/038,079, 55 pgs.
Azhar et al., Efficient selection of access control systems through multi criteria analytical hierarchy process, IEEE, doi: 10.1109/ICET.2012.6375419, pp. 1-8, 2012, 8 pgs.
Rox et al., Construction and Deconstruction of Hierarchical Event Streams with Multiple Hierarchical Layers, IEEE, doi: 10.1109/ECRTS.2008.13, pp. 201-210, 2008, 10 pgs.
Notice of Allowance dated Feb. 18, 2022 for U.S. Appl. No. 17/083,145, 70pgs.

* cited by examiner

EXPIRATION OF DATA STREAMS FOR APPLICATION PROGRAMS IN A STREAMING DATA STORAGE PLATFORM

TECHNICAL FIELD

The subject application relates generally to data storage, and, for example, to a technology that applies expires data in storage systems that implement data streams for storing and serving continuous and unbounded data, and related embodiments.

BACKGROUND

Contemporary data storage systems, such as DELL EMC's PRAVEGA system/data storage service, store data in a storage abstraction referred to as a stream. A stream is identified with a name, and can store continuous and potentially unbounded data; more particularly, a stream comprises a durable, elastic, append-only, sequence of stored events. One stream may be divided into one or more segments, such as based on the routing keys associated with the events. Older stream data can be aggregated into chunks and written to an object storage system (e.g. Dell EMC's ECS data storage system) or to a file storage system (e.g. DELL EMC's ISILON data storage system).

New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

Although a stream is potentially unbounded, storage resources are finite. PRAVEGA provides ways to cut a stream short, including an automatic data expiration feature and an explicit truncate call. When cut, the events are deleted from a head (back) of a stream, which can be based on an expiration policy.

In contemporary enterprise environments, two or more application programs may work with the same data stream, but each application may belong to a different organization (group) that has different requirements related to data lifetime management of that data stream. For example, one organization may want a stream of data to expire after thirty days, while another organization may want the same stream of data to expire after sixty days. Further, the data accessible to one organization often needs to be isolated from the other organization, causing a conflict with respect to the time limit for automatic data expiration. Manual resolution of the conflict, which would need to select the longer expiration period, is undesirable in general. Moreover, an application that reads from the head of the data stream may work incorrectly when the application expects the oldest data event in the stream to correspond to (approximately) the expiration period. For example, an application expecting a stream's oldest events at the stream's head to be not much older than two days old can work incorrectly if the stream's oldest events that the application is actually able to read are two years old.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
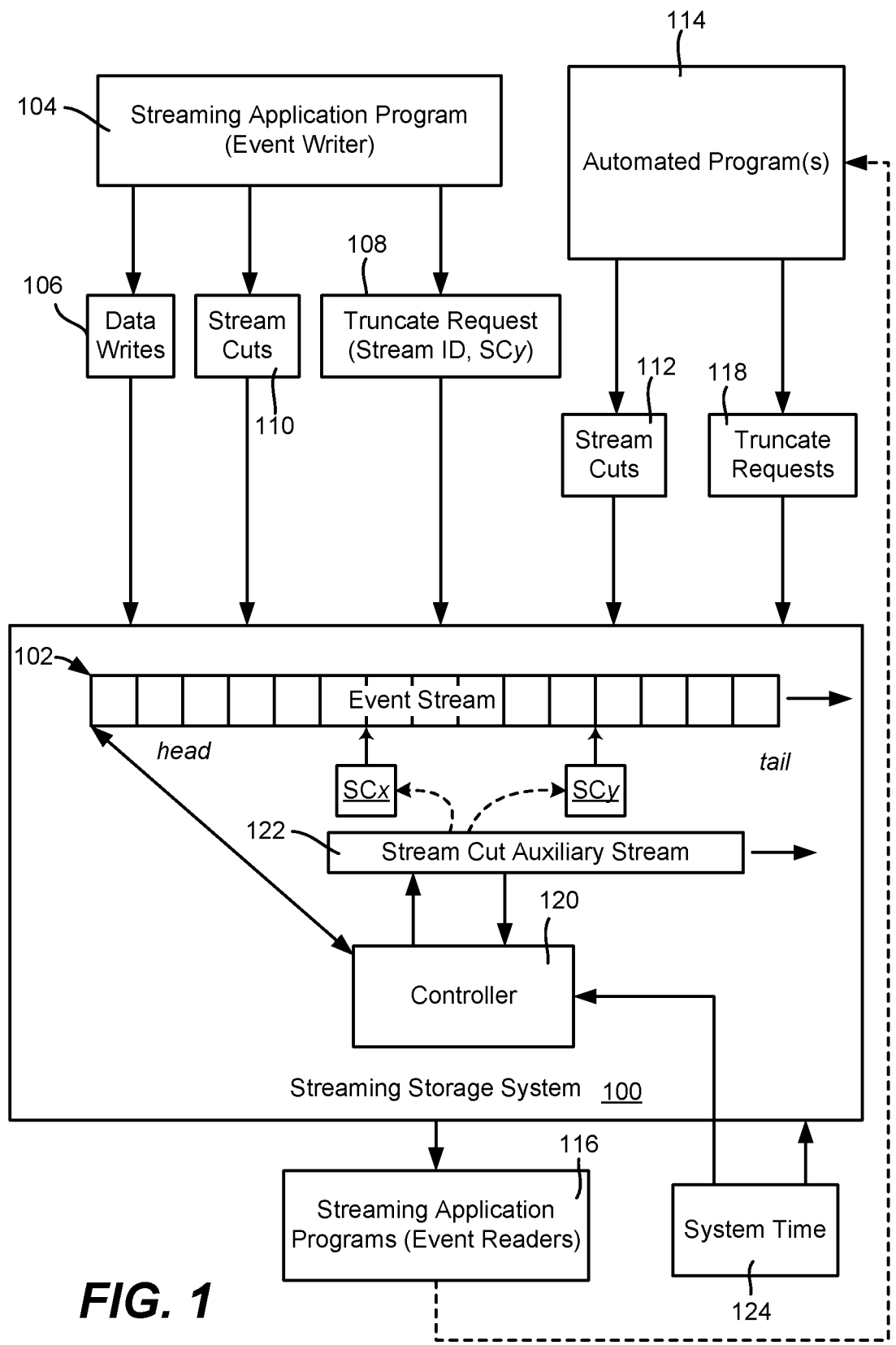
FIG. 1 is a block diagram representation of example components and data-related operations in a streaming data storage system in which application programs can be subject to different data expiration times, in accordance with various aspects and implementations of the subject disclosure

Various aspects of the technology described herein are generally directed towards facilitating application-based views of the same data stream, in which each view that an application obtains is based on that particular application's data expiration policy, corresponding to a data expiration time. The technology thus supports real-life (e.g., enterprise-level) workloads in which two or more applications work with one data stream but have different specifications related to stream data lifetime management.

In general, a data expiration time period can be separately specified (or can obtain a default data expiration time period) for each application with respect to a data stream that such an application is registered to read. The time limit of the effective overall data expiration policy, which physically deletes stream data to release storage capacity, can be the greatest time limit among the time limits associated with the applications that work with the stream data.

Instead of having the applications being able to read the entire stream from the stream head based on the most recent physical deletion, different views of the data stream state are maintained for different applications. The view for any individual application depends on the data expiration policy specified for that individual application. More particularly, the stream normally appears to have different stream heads for applications with different data expiration policies. The view that an application has on a data stream (that is, the view presented to the data stream) is thus based on the data expiration policy specified for the application for that data stream, rather than being based on the entire remaining data stream's events.

It should be noted that some data storage systems may refer to data expiration/a data expiration policy as corresponding to data retention/a data retention policy. In general, a data storage system is expected to automatically delete data after the data's expiration period, whereas a data storage system is expected to actively prevent data from deletion during the data's retention period. For example, data may become expired and thus deleted based on a data retention policy. Thus, as used herein, the terms data expiration, data expiration time, data expiration period and/or data expiration policy refer to what other data storage systems may refer to as data retention, data retention time, data retention period and/or data retention policy, respectively, in those data storage systems.

It should be understood that any of the examples herein are non-limiting. For instance, some of the examples are based on PRAVEGA data storage technology; however virtually any stream-based data storage system may benefit from the technology described herein. As a more particular example, instead of tracking time for each event written in PRAVEGA, a "stream cut object" or simply a "stream cut" refers to a specific position in the data stream that is generated by a data writer (including one periodically or otherwise written by the system); older data needs to be deleted from a stream cut boundary (rather than arbitrarily). Such a stream cut is associated with a time value. Other data stream storage systems can use a similar concept, or can use timestamped data; notwithstanding, as will be understood, the technology described herein can be applied to any stream-based data storage mechanism that tracks position/time of stored data. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes an event stream 102 comprising a data stream of events, with event writes being appended from a head towards a tail direction. Note that for simplicity, FIG. 1 does not illustrate the concept of stream data segments. However, it is noted that a stream may be split into a stream segments (or simply segments), which act as logical containers for events within the stream. When a new event is written to a stream, the new event is stored to one of the segments based on the event's routing key, e.g., based on consistent hashing of the event's routing key to assign the event to a segment, in which the consistent hashing of the full set of events' routing keys forms a "key space" that is divided into a number of partitions, corresponding to the number of segments. Note that the number of parallel segments in a stream can automatically increase and decrease over time based on the I/O load the stream receives, which can be referred to as automatic scaling.

In general, an event writer such as a streaming application program 104 sends data writes (events) 106 to the streaming data storage system 100 for appending to the event stream 102. Note that with respect to event writers, the processing and handling of appends are unchanged (e.g., in the PRAVEGA system) with respect to supporting stream applications as described herein.

The application program 104 can also send truncate requests 108 to the streaming storage system 100, such as by identifying the stream for which truncation is requested, and specifying a particular stream cut. As will be understood, however, an application program can only request logical truncation, with physical truncation being possibly dependent on another application program's (or the system's) data expiration policy As set forth above, a position in a stream at an event boundary is specified using a stream cut. A writer application program 104 can request association of a stream cut with a stream, as represented by block 110. Instead of, or in addition to, application-specified stream cuts, stream cuts 112 can be created automatically, such as periodically, by automated program(s) 114 or the like. As described herein, one such automated program can generate a stream cut at a frequency based on the minimum expiration time of a group of applications 116 that read the stream 102. For example, consider that among the group of applications 116 that read the stream, the shortest expiration time is ten days; a suitable frequency for an automatic stream cut may be every one day based on ten percent of the ten day period, or every half day based on five percent of the ten day period. The automated program(s) can also send truncate requests 118, such as when the stream reaches a size capacity limit. A controller 120 as described herein manages application-based stream cuts, and automatic data expiration corresponding to views for the reader application programs 116.

The stream cuts for a stream can be considered a series of stream cuts. In one or more implementations, the stream cuts may be maintained as an auxiliary system stream 122 associated with the main data stream, e.g., the main data event stream 102 in FIG. 1. A time value (obtained from the system time) can be associated with each stream cut, such as corresponding to when a given stream cut object is created. For example, the correct system time (block 124) can be obtained via use of the NTP (Network Time Protocol).

In one implementation, an administrator can specify three data expiration time limits for a data stream, namely a minimal time, maximal time and a default time. Note that these data expiration times are generally application dependent, as for example, video generated by surveillance cameras may be maintained on the order of months, whereas some other sensor-generated data may be maintained on the order of a few days.

The minimal time is a minimal time limit for stream data as deemed reasonable for an administrator responsible for the applications that read the data stream, e.g., thirty days for video from surveillance cameras. The minimal time can be used as an effective data expiration limit for the stream in a situation in which no applications are registered to read its data, or if someone else later attempts to register an application with a shorter data expiration limit.

The maximal time allowed for a data stream can be set, e.g., at ninety days. This limit can be calculated using information about total system capacity, expected ingestion rate to streams and so forth to assure system stability. The system should not end up having no available capacity.

The default time provides a default limit (e.g. sixty days) for applications that do not explicitly specify an expiration policy. In one implementation, the default time has to be in the range between the minimal time and maximal time, inclusive.

Turning to aspects related to data expiration, upon registration of an application with the streaming system, e.g., via the controller 120 as described herein, the application can specify its data expiration policy or implicitly accept the default one. Each policy specified is expected to (or can be enforced to) comply with the administrator-determined time limits configured for the data stream.

From the data expiration policy, the streaming system is to calculate the effective data expiration policy for the stream. The time limit of the effective data expiration policy is the greatest time limit among all the time limits associated with the applications that work with the stream data. The system can use the effective data expiration policy to physically delete stream data to release storage capacity, as is currently operational in existing systems, e.g., the PRAVEGA streaming system.

It should be noted that the system can retain the data stream for a time that is longer than any application specifies, or even the maximal time, such as for use with what is referred to as "system" or "global" reads (in contrast to application reads). For example, consider that government regulations may specify that some stream of data events may need to be retained for two years; however the (only other) two applications A and B that regularly read the data may only want a one-month and two-month view of the data, respectively. In such a situation, the system data stream expiration/retention policy of two years (e.g., set by a higher-level administrator) will override the maximum data stream expiration policy of two months selected from among the two applications' specified expiration time periods, and thus will physically delete stream data based on the storage system's two year data expiration (corresponding to the regulatory retention period). However, as described herein, the applications will only get respective stream views based on the applications' respective associated data expiration time periods.

Figure 2:
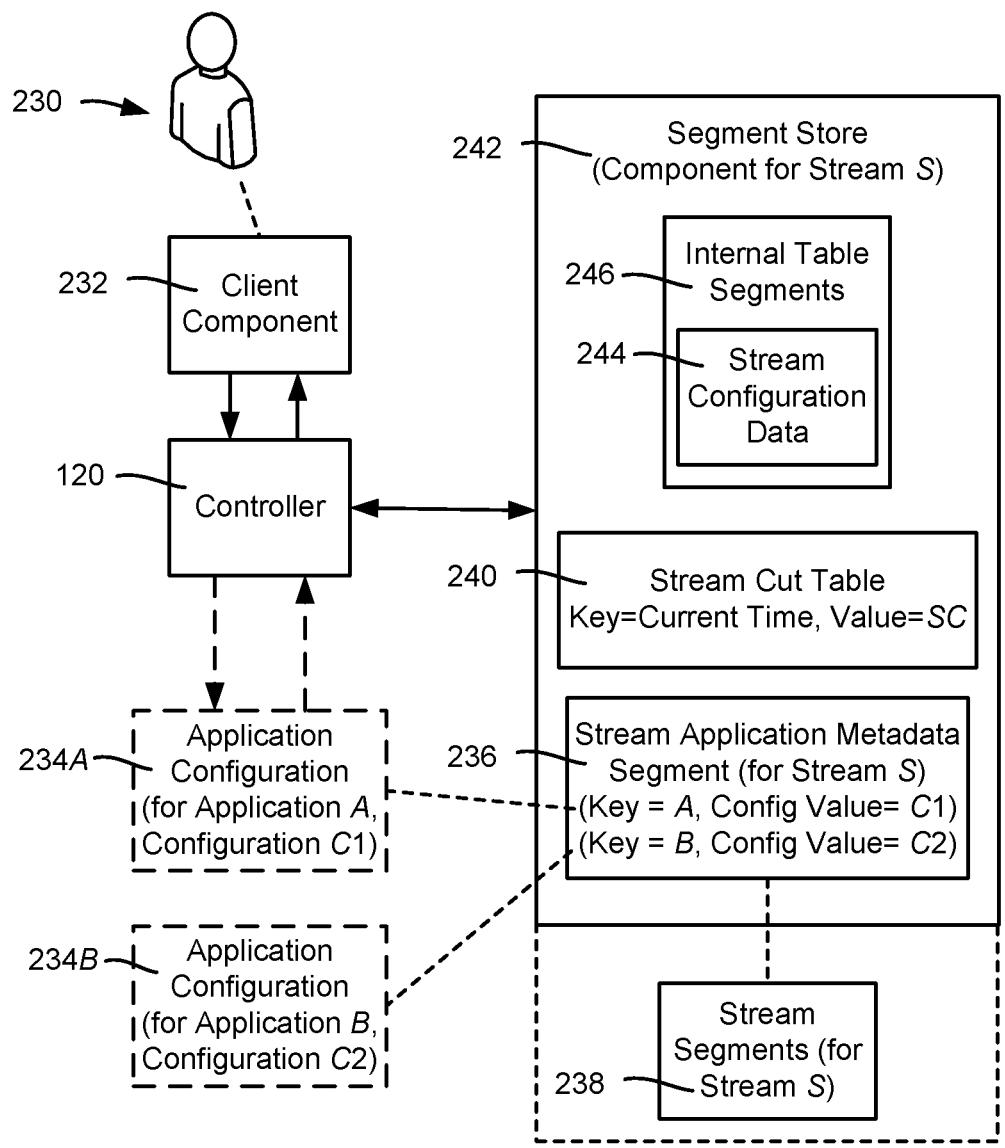
FIG. 2 is a block diagram showing example components and data structures that can be used to present different views to different reader application programs based on the applications being associated with different data expiration times, in accordance with various aspects and implementations of the subject disclosure.

FIG. 2 shows various aspects of data managed by the controller 120 with respect to a stream application comprising an application program that uses a stream and has an expiration policy associated with the stream. In general, each data stream has a set of applications that are registered to the data stream. A user 230 (e.g., an administrator) may modify this set of applications via APIs in a client component 232 of the system (e.g., a PRAVEGA component) by adding, removing or updating each per-application configuration (blocks 234A and 234B); any practical number of such applications/application configurations can be registered.

The client component 232 sends such requests to the controller 120, which manages the application-related aspects of the stream, (and also may manage at least some system-related aspects of the stream). In one implementation, to store the stream application information, the controller 120 maintains a stream application metadata segment 236, comprising a table segment or other suitable data structure, which can be a non-distributed key-value store built on top of regular data segments 238. To store streamcuts, the controller 120 maintains a stream cut table 240, comprising a sorted table segment or other data structure that can list entries sorted by key). As with other table segment data structures, the stream application metadata segment 236 and the stream cut table 240 are maintained by a segment store component 242 (e.g., another PRAVEGA component). Note that the stream/data segments 238 can be maintained in the segment store component 242.

In one implementation, existing stream configuration data 244 (which typically includes scaling policy for automatically scaling data stream segments and data expiration policy) is extended with respect to the limits and values (minimal time, maximal time and default values) that are defined for data expiration as set forth herein. The user, when creating or updating the stream configuration data 244, specifies the minimal time value, maximal time value and default time value for any applications that will work with the stream. The stream configuration data 244 is maintained by the controller 120, which stores the configuration data 244 in internal table segments 246 (maintained by the segment store component 242).

The stream application metadata segment 236 facilitates application-related stream management aspects of the controller 120. In general, in response to requests from the client component 232, the controller 120 inserts, updates or removes entries from the stream application metadata segment 236. When performing expiration activities (e.g., truncating streams), the controller 120 fetches/iterates through entries in the stream application metadata segment 236.

More particularly, by way of an example, consider when a new application A is registered with the system in association with a stream S, that is, a user 230 via the client component 232 to the controller 120, requests the registration of application A to stream S with configuration (config) C1. In response, the controller 120 determines where the stream application metadata segment 236 for stream S is located (that is, which segment store is associated with the stream S.

The controller 120 further sends a request to the segment store component 242 that owns stream S's application metadata segment 236 instructing the segment store component 242 to insert an entry for the application and configuration {A:=C} with (Key=A, Value=C1). Note that the configuration data 234A can be within the value C1 for key A, or if the configuration data is sufficiently large, the value can be a pointer to another data structure that contains the configuration data 234A. Similarly, another application B can be registered, such as with a different configuration C2, e.g., as represented by the block 2348.

For an initial registration, if the entry insertion is successful, the success is propagated back to the controller 120, the client component 232 and back to the user 230. Conversely, if an entry already existed for the key-value pair (e.g., Key=A, Value=C1), the segment store component 242 raises an error that is bubbled up to the user 230.

To update an existing configuration, a user 230 via the client component 232 to the controller 120, requests updating of application A's configuration C1 with respect to stream S. In turn, the controller 120 requests the segment store to update the entry, e.g., with updated configuration data. If the entry update is successful, the success is propagated back to the controller 120, client component 232 and back to the user 230. Conversely, if the entry does not exist for the key value pair (Key=A, Value=C/), the segment store component 242 raises a corresponding error that is bubbled up to the user 230.

To unregister an application, (similar to registration) the user 230 requests (to the client component 232) deregistration of the application A from the stream S. The client component 232 delegates the request to controller 120, which determines where the stream application metadata segment 236 for stream S is located, that is, in which segment store 242. One located, the controller 120 sends a request to the segment store 242 owning the stream's stream application metadata segment 236, instructing the segment store 242 to remove any entry with Key A. Whether or not the A key entry existed, success can be reported; (although it is feasible if the key does not exist to notify the user that perhaps the wrong application was identified).

Figure 3:
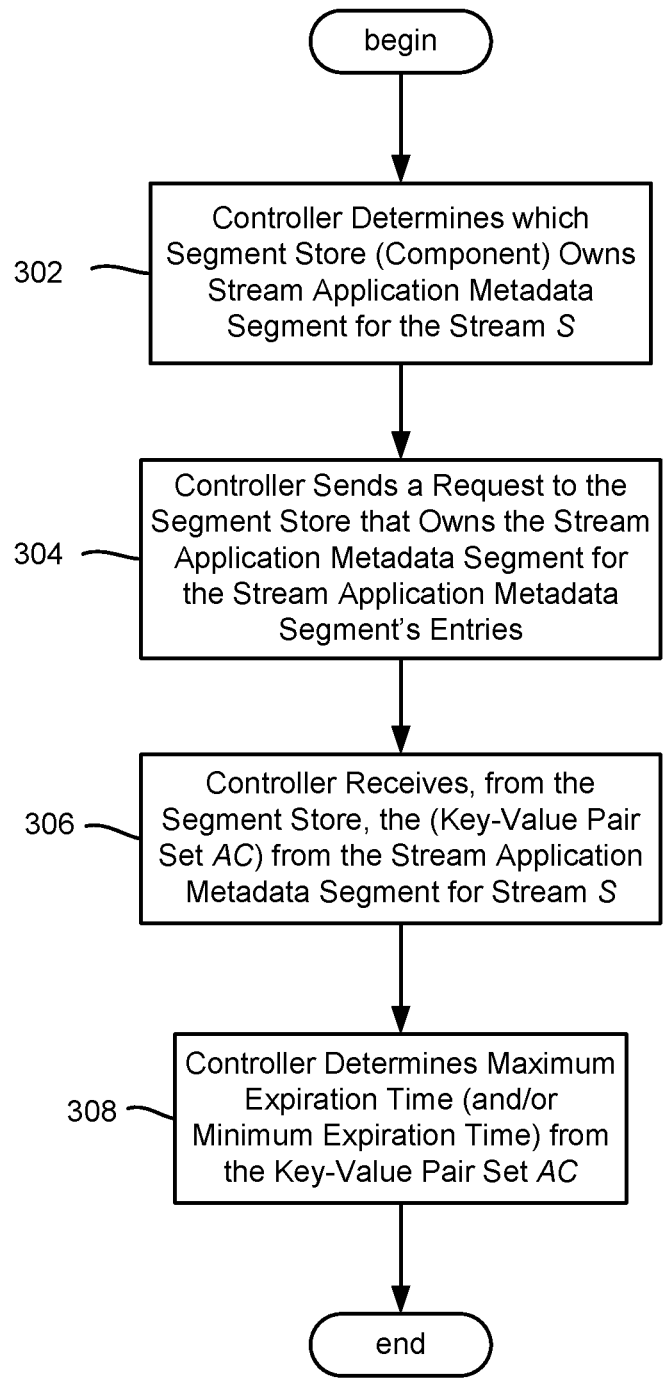
FIG. 3 is a flow diagram showing example operations of a controller that determines a maximum (or minimum) data expiration time among a set of applications registered to access the same data stream, in accordance with various aspects and implementations of the subject disclosure.

Turning to another aspect, namely determining the maximum expiration value across a set of applications registered with respect to the stream S, consider that the controller 120 is about to perform expiration activities on stream S. As shown in the flow diagram of FIG. 3, at operation 302 the controller 120 determines where the stream application metadata segment 236 for stream S is located (which segment store component owns the application metadata segment 236), which in the example of FIG. 2 is the segment store 242.

As represented at operation 304, the controller 120 sends a request to the segment store 242 that owns S's stream application metadata segment 236, requesting the full set of (key, value) entries in the stream application metadata segment 236. As represented at operation 306, the segment store 242 returns the key-value pair set AC from S's stream application metadata segment 236, which the controller receives.

As represented at operation 308, from these entries the controller 120 determines the maximum expiration time from AC, such as by calculating $Max(C_i.ExpirationTime)$ where $C_i \in Values(AC)$.

It should be noted that determining the minimum expiration value across applications is generally similar (and is also represented by operation 308), and thus for example can be calculated as $min(C_i.ExpirationTime)$ where $C_i \in Values(AC)$. The controller can determine the maximum expiration time, the minimum expiration time, or both whenever the full set of entries is obtained from a segment store.

The minimum value can be used for generating a stream cut. Note that while the general process by which the controller 120 generates a single stream-cut already exists, the existing default implementation in the controller generates the stream cuts at a fixed interval that is set via a global configuration. As described herein, the controller 120 can alternatively generate and store stream-cuts based on having multiple applications per stream.

Figure 4:
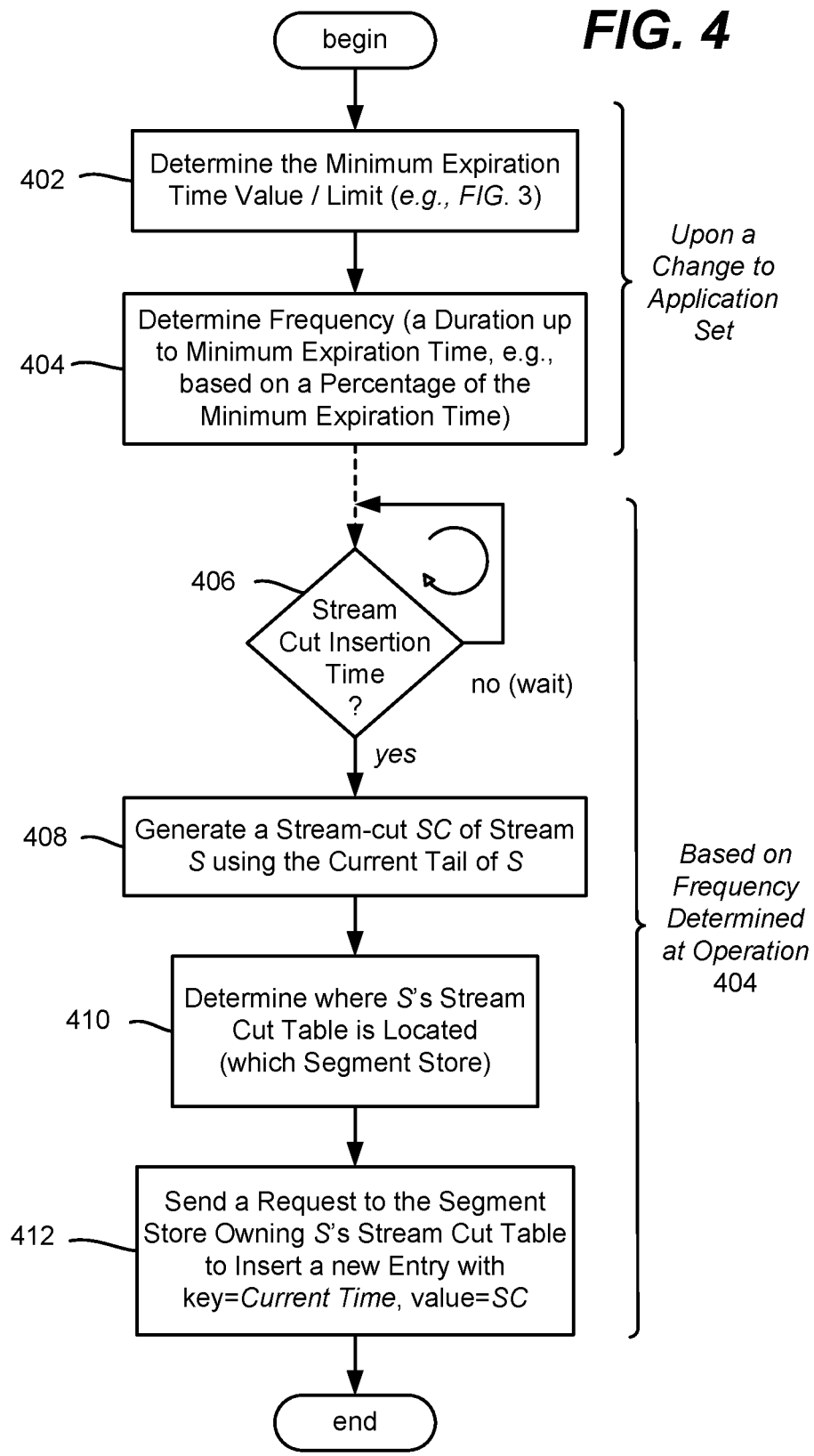
FIG. 4 is a flow diagram showing example operations of a controller to determine a stream cut insertion frequency based on the minimum data expiration time of a set of applications registered to access the same data stream, in accordance with various aspects and implementations of the subject disclosure.

FIG. 4 shows an example flow diagram of implementing automatic stream cut insertion based on a set of applications registered for a stream S. For example, any time a change is made to the application set (registration, update or deregistration), the controller 120 can execute operation 402, corresponding to the example operations of FIG. 3, to determine the minimum expiration value/limit among the applications. If no applications remain defined, the controller 120 can use the minimal time value initially defined by the administrator for the set of applications, as the minimum expiration time. Operation 404 represents determining the frequency of the stream cut insertions for this set of applications. The frequency needs (and can be enforced) to be a duration up to the minimum expiration time, but (likely more desirably) can be is a fraction of the minimum expiration time (such as ten percent thereof) to provide for sufficient granularity of truncations.

Once the frequency is determined, FIG. 4 further shows example operations for generating the stream-cuts. More particularly, based on the frequency determined at operation 404, via operation 406 each time a corresponding time interval elapses, the controller 120 at operation 408 generates a stream-cut SC for stream S using the current tail of S. Operation 410 determines where S's stream cut table 240 is located (e.g., the segment store 240 in this example), and operation 412 sends a controller request to the segment store 242 that owns S's stream cut table 240 to insert a new entry with (key=Current Time, value=SC). Note that because the current time is always increasing, there is no chance of a key collision.

Figure 5:
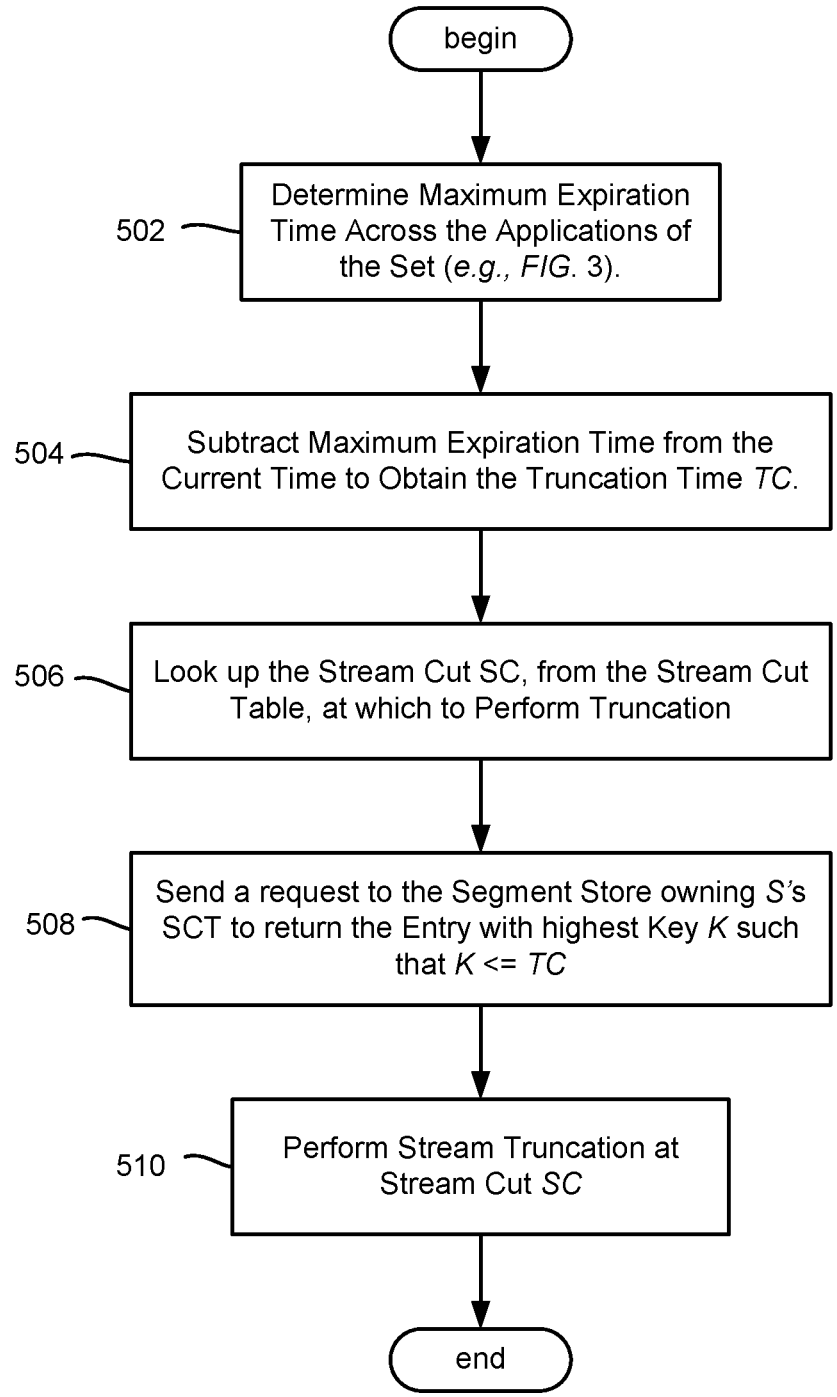
FIG. 5 is a flow diagram showing example operations of a controller to truncate a data stream based on the maximum data expiration time of a set of applications registered to access the same data stream, in accordance with various aspects and implementations of the subject disclosure.

The controller 120 is configured with a sub-process for performing automatic expiration, which can be updated as described herein to perform application-based automatic data expiration, in this example using the stream cut table 240 and stream application metadata segment 236 for the group of applications registered for the stream S. FIG. 5 shows example operations for such application-based automatic expiration, beginning at operation 502 which can use the operations of FIG. 3 as described herein to calculate the maximum expiration time across the applications. At operation 504, this maximum expiration time value can be subtracted from the current time to obtain the next truncation time TC.

Operation 506 represents the controller 120 looking up from the stream cut table 240 the stream cut SC from which to perform truncation. At operation 508, the controller sends a request to the segment store 242 that owns S's stream cut table 240 to return the entry with highest key K such that K<=TC. Note that because in one implementation the stream cut table 240 is a sorted table segment, this is straightforward to obtain.

Operation 510 represents performing stream truncation at the stream cut SC. This is an existing process in PRAVEGA, for example, in which in general the segments wholly before the stream cut SC are deleted, and any segment in S that intersects SC is head-truncated.

Turning to aspects related to reading the stream, at present there can be two types of reads, namely global reads (system reads) and application reads. Global reads are classical stream reads that are configured to read an entire stream, being agnostic to applications and their policies. In contrast, application-based reads consider stream application views (based on the tail-end section of the stream that begins at that application's stream-cut).

Figure 6:
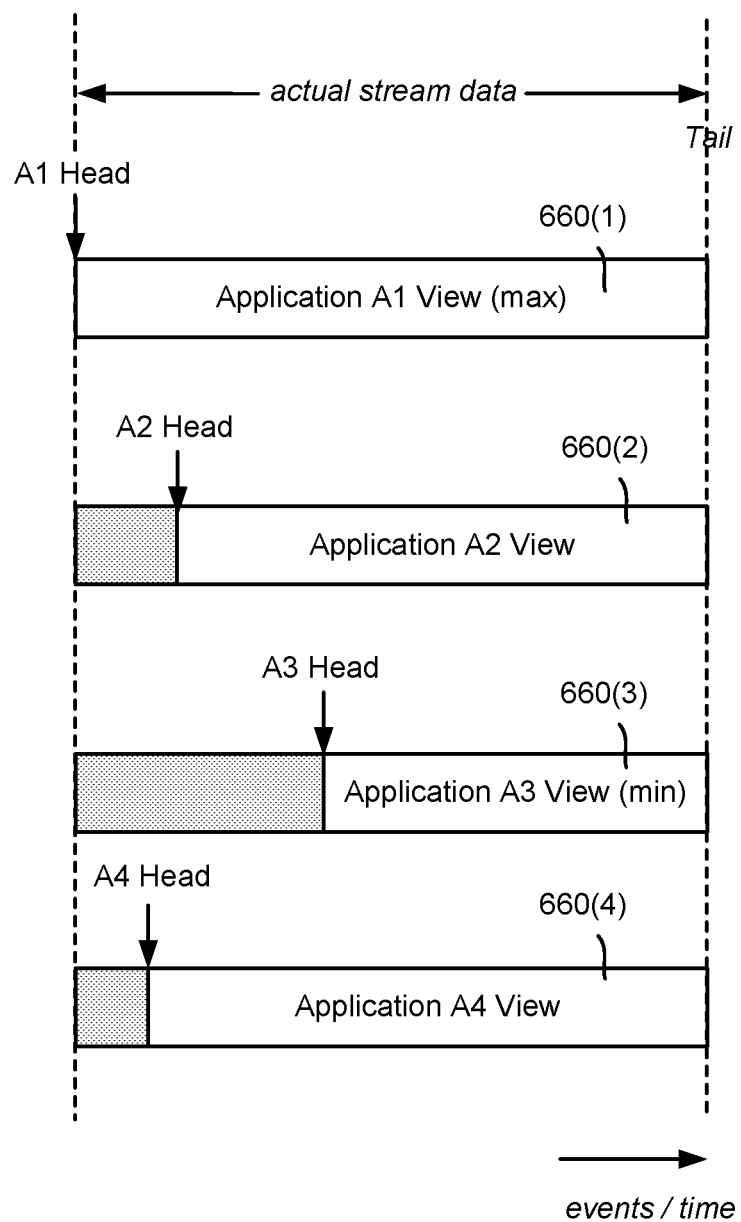
FIG. 6 is a representation of different views presented to different application programs that read a data stream based on different data expiration times associated with the different applications, in accordance with various aspects and implementations of the subject disclosure.

FIG. 6 shows the concept of application-based reads with respect to views. As can be seen, four applications 660(1)-660(4) (also identified as A1-A4, respectively) are registered to read the same data stream. For purposes of simplicity, consider that the stream is truncated based on the maximum application expiration time, (not a system expiration time), which in the example of FIG. 6 corresponds to application 660(1) (application A1). Note that the application 660(3) has the minimum application expiration time, and thus the frequency of inserting stream cuts can be based on this application's expiration time.

As can be seen, because truncation is based on the maximum application expiration time among the applications, which is the application 660(1) in this example, the application 660(1) has the entire view of the data stream. In contrast, the application 660(2) has a different view because of having a different stream head (A2 head) recorded therefor, and so on for the applications 660(3) and 660(4). Note that the shaded portion left of the heads A2-A4 for the applications 660(2)-660(4), respectively, is data that is still physically present, but not readable to the applications 660(2)-660(4) because of their respective views based on logical truncation.

Figure 7:
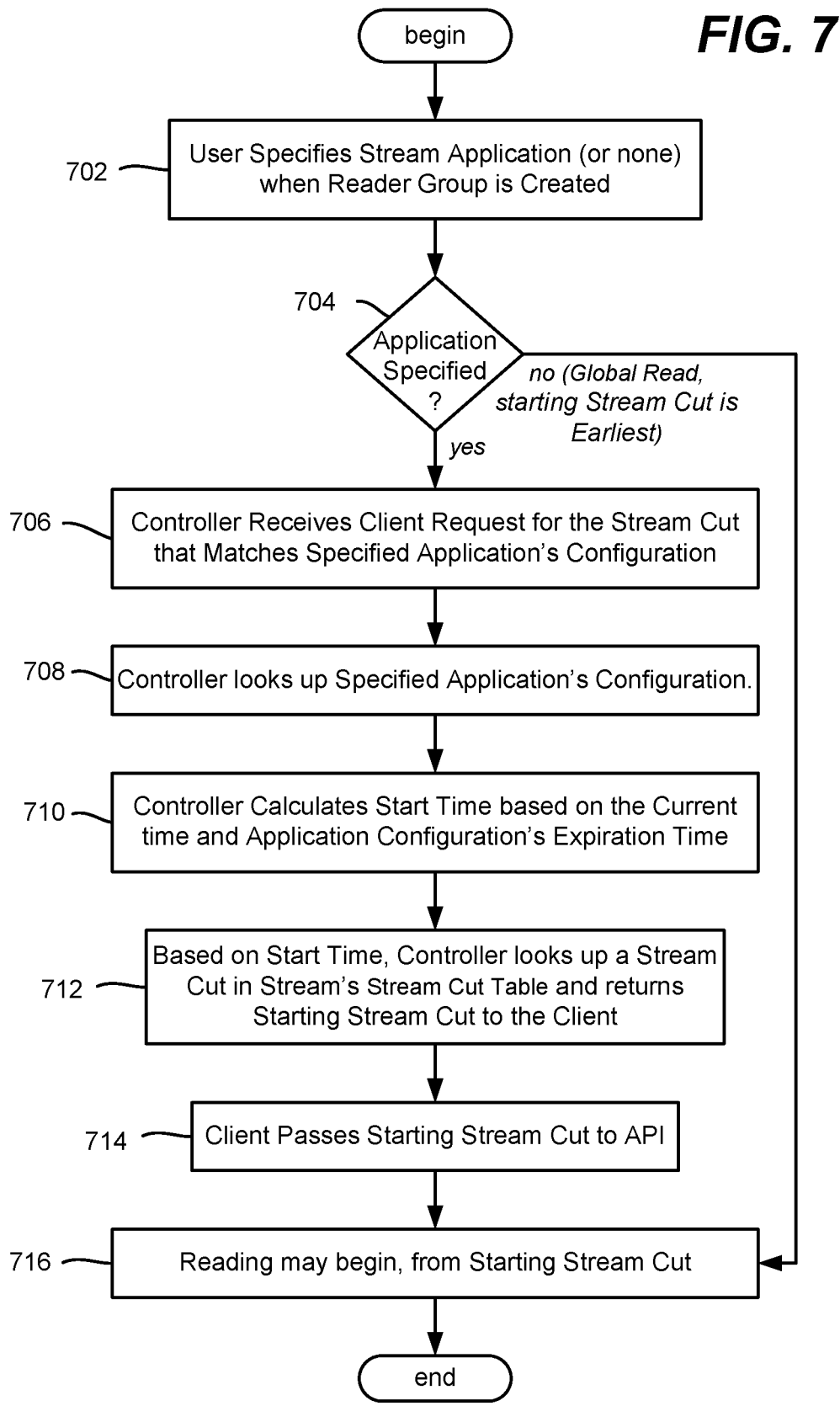
FIG. 7 is a flow diagram showing example operations related to providing a view of a data stream to an application program, in which the view is based on the data expiration time associated with that application program, in accordance with various aspects and implementations of the subject disclosure.

FIG. 7 is a flow diagram of example operations showing how application reads are implemented in one implementation. To this end, at operation 702, the user can specify a stream application (e.g. the application A) when a reader or reader group is created. Note that two or more readers can be organized into a reader group, comprising a named collection of readers, which together perform parallel reads from a given stream.

At the time to read, as represented by operation 704, if no application is specified, this is a global (system) read, and no applications are involved. If so, the process branches to operation 716 to perform the global read, which can be from the starting stream cut, which in this example can correspond to the application-based maximum view size (or be based on a system stream cut, which may or may not correspond to the application-based maximum view size).

For an application read, at operation 706 the client component requests from the controller 120 the stream-cut that matches the particular application's (e.g., application A's) configuration (e.g., configuration C1). Each application has its own stream cut, and each can be different from the other expiration-based stream cut(s) for other application(s) in the set.

As described herein, via the segment store, at operation 708 the controller 120 looks up the application A's configuration C1. At operation 710, the controller 120 calculates a start time ST based on the current time and C1's expiration time.

At operation 712, based on the start time ST, the controller 120 looks up a stream cut SC in S's stream cut table 240 as generally described herein, and returns this SC to the client component. As represented by operation 714, the client component delegates (e.g., via an existing API for reader group creation, which accepts a starting stream cut), and passes in SC. At operation 716, reading can now occur from the starting stream cut, which thus defines the view for the application A.

By maintaining different views on stream state for different applications, the view of an individual application depends on the data expiration policy specified for that application. In this way, as exemplified in FIG. 6, a data stream appears to have different stream heads for applications with different data expiration policies.

Figure 8:
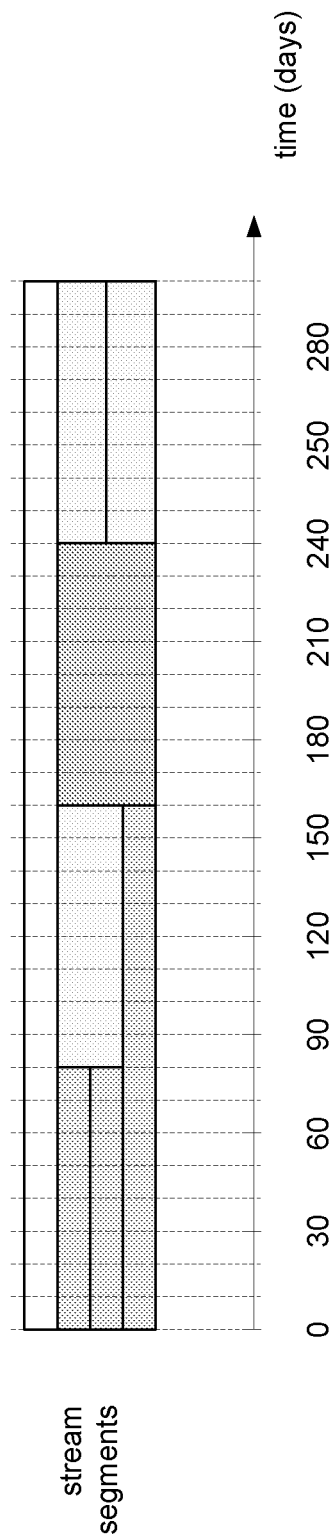
FIG. 8 is a representation of a data stream with segments that are automatically scaled over time, in which different application programs can be presented with different views based on different data expiration times associated with the different applications, in accordance with various aspects and implementations of the subject disclosure.

By way of another example, consider that automatic scaling stream of FIG. 8, in in which the segments are shown as shaded to emphasize how the number of segments scales (increases and decreases) over time. In this example, the data expiration limits for the stream are minimal time thirty days, default time sixty days and maximal time ninety days.

Two applications, application A1 and application A 2, work with the stream. The first application A1 specifies data expiration after ninety days. The second application A2 specifies no data expiration policy, so the default data expiration of sixty days is applied to application A2. The two applications thus will have different views on the stream as described herein.

The time limit of the first application, which is the longest one, is used as the effective limit for the stream. The system (the controller component) creates stream-cuts and assesses the stream, e.g., every ten days.

Figure 9:
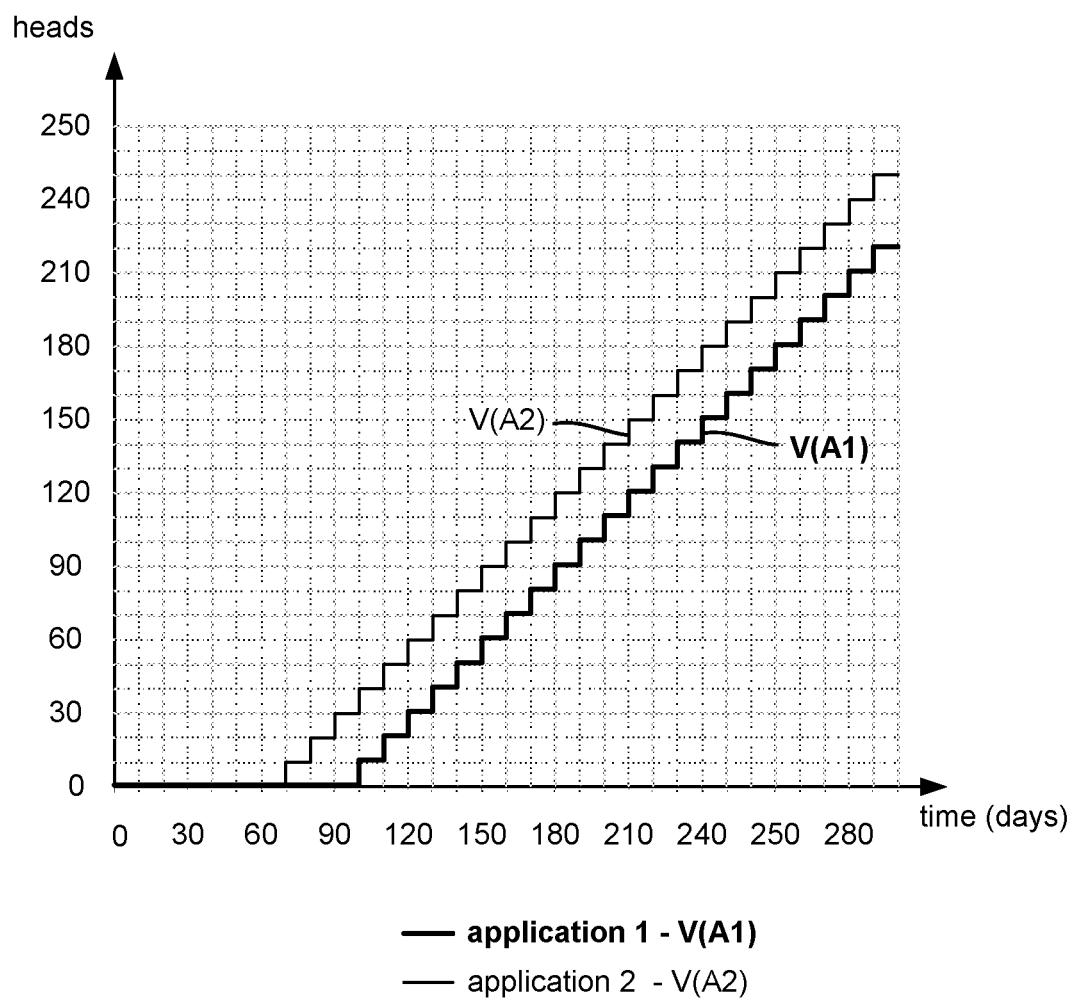
FIG. 9 is a graphical representation demonstrating how two applications can have different time-based views of a data stream, in accordance with various aspects and implementations of the subject disclosure.

As represented in FIG. 9, the two applications have different views V(A1) and V(A2) on the stream. More particularly, as can be seen, the two applications have the same view on the stream until an initial stream truncation, a logical one, happens after seventy days (sixty days plus the ten day assessment time). As the first application's data expiration policy is the effective one, the first application sees the stream as it physically is stored, back to head zero (0), because physical truncation is based on the first application's data expiration policy. The second application A2 is truncated logically in accordance with its data expiration policy, and thus after the first logical truncation can only see back to head ten (10).

After the logical stream truncation, the stream for the second application starts with the position addressed by the stream-cut created, at the moment ten days. The stream will be truncated logically two more times before the first physical truncation, which happens after one-hundred days (the ninety day expiration of application A1 plus the ten day assessment time). After that, the stream is truncated both logically and physically every ten days. When this occurs, the first application will thereafter see a view (view V(A1)) of the stream that is thirty days older than the view (view V(A2)) of the stream that the second application sees.

Turning to another aspect, the technology described herein can be used to organize flexible cost-based charging of storage clients. For example, there are different types of reads that clients can need, such as tail and catch-up reads used for real-time or near real-time analytics, in contrast to historical reads, comprising reads of older data, which exist mainly for batch-mode analytics. Tail and catch-up reads are generally lightweight, as the data to be read (or at least its considerable part) typically already resides in a read cache. Historical reads are rather heavyweight, particularly in a two-tier model in which older stream data is written to an object storage system or to a file storage system.

Thus, a streaming platform can be configured to automatically charge its clients based on client use profiles. For example, an inexpensive profile with a minimal data expiration policy can be provided that in general allows only tail and catch-up reads only. A moderate profile can have a default data expiration policy that also allows access to a part of historical data. A more expensive profile with a maximal data expiration policy can allow access to all stream data up to some large data expiration time, including very old data. Note that coexistence of the different profiles on the same data stream does not impact physical availability of stream data; e.g., as long as the older data is not physically gone, such as by maintaining the older data in less expensive object or file storage, a client with an inexpensive profile can switch to a more expensive profile should older data need to be read.

Figure 10:
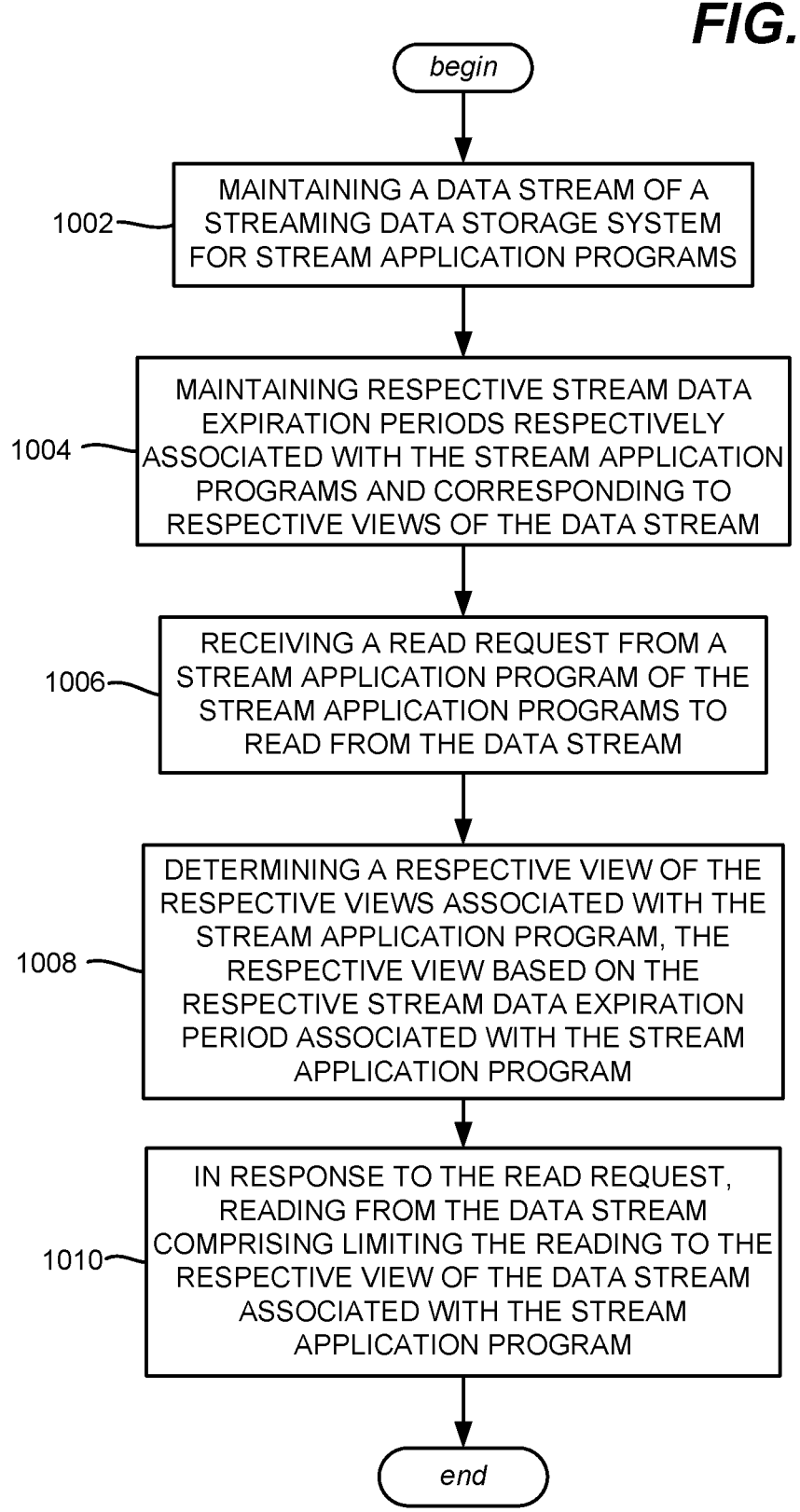
FIG. 10 is an example flow diagram showing example operations related to handling a data read request from an application, in which the reading is limited by a view that is based on a stream data expiration time for that application, in accordance with various aspects and implementations of the subject disclosure.

One or more aspects can be embodied in a system, such as represented in FIG. 10, and for example can comprise a memory that stores computer executable components and/or operations, and a processor that executes computer executable components and/or operations stored in the memory. Example operations can comprise operation 1002, which represents maintaining a data stream of a streaming data storage system for stream application programs. Operation 1004 represents maintaining respective stream data expiration periods respectively associated with the stream application programs and corresponding to respective views of the data stream. Operation 1006 represents receiving a read request from a stream application program of the stream application programs to read from the data stream. Operation 1008 represents determining a respective view of the respective views associated with the stream application program, the respective view based on the respective stream data expiration period associated with the stream application program. Operation 1010 represents, in response to the read request, reading from the data stream comprising limiting the reading to the respective view of the data stream associated with the stream application program.

Maintaining the data stream can comprise truncating the data stream based on a longest data expiration period of one of the stream application programs. Truncating the data stream can comprise truncating to a stream cut point.

Further operations can comprise determining a frequency of generating stream cut points based on a shortest data expiration period of another one of the stream application programs, other than the one.

The data stream can comprise scaling segments, and reading from the data stream can comprise reading from the scaling segments.

The stream application program can be a first stream application program, the respective view can be a first respective view, the read request can be a first read request, the respective data expiration data can be first respective data expiration data, and further operations can comprise receiving a second read request from a second stream application program of the stream application programs to read from the data stream, determining a second respective view associated with the second stream application program based on second respective data expiration data associated with the second stream application program, and, in response to the second read request, further reading from the data stream comprising limiting the further reading to the second respective view of the data stream associated with the second stream application program.

Maintaining the respective stream data expiration periods associated with respective stream application programs of the group can comprise maintaining respective metadata associated with the stream application programs, respectively.

The stream application programs can be registered to the data stream as readers via a system controller.

The stream application program can be registered to the data stream at a registration time, and a respective stream data expiration period, of the respective stream data expiration periods, associated with the stream application program can be established at the registration time.

Further operations comprise modifying the respective stream data expiration period associated with the stream application program after the registration time.

The stream application program can have read profile data that specifies a respective type of available read request access to the data stream. A respective stream data expiration period, of the respective stream data expiration periods, can be associated with the stream application program, and the read profile data can comprise one of: tail and catch-up read access based on a relatively short respective data expiration period according to the respective stream data expiration period being less than or equal to a defined upper period limit, partial historical read access based on a relatively moderate respective data expiration period according to the respective stream data expiration period being within a defined period range from the defined upper period limit to a defined lower period limit, or historical read access based on a relatively long respective data expiration period according to the respective stream data expiration period being greater than or equal to the defined lower period limit.

Figure 11:
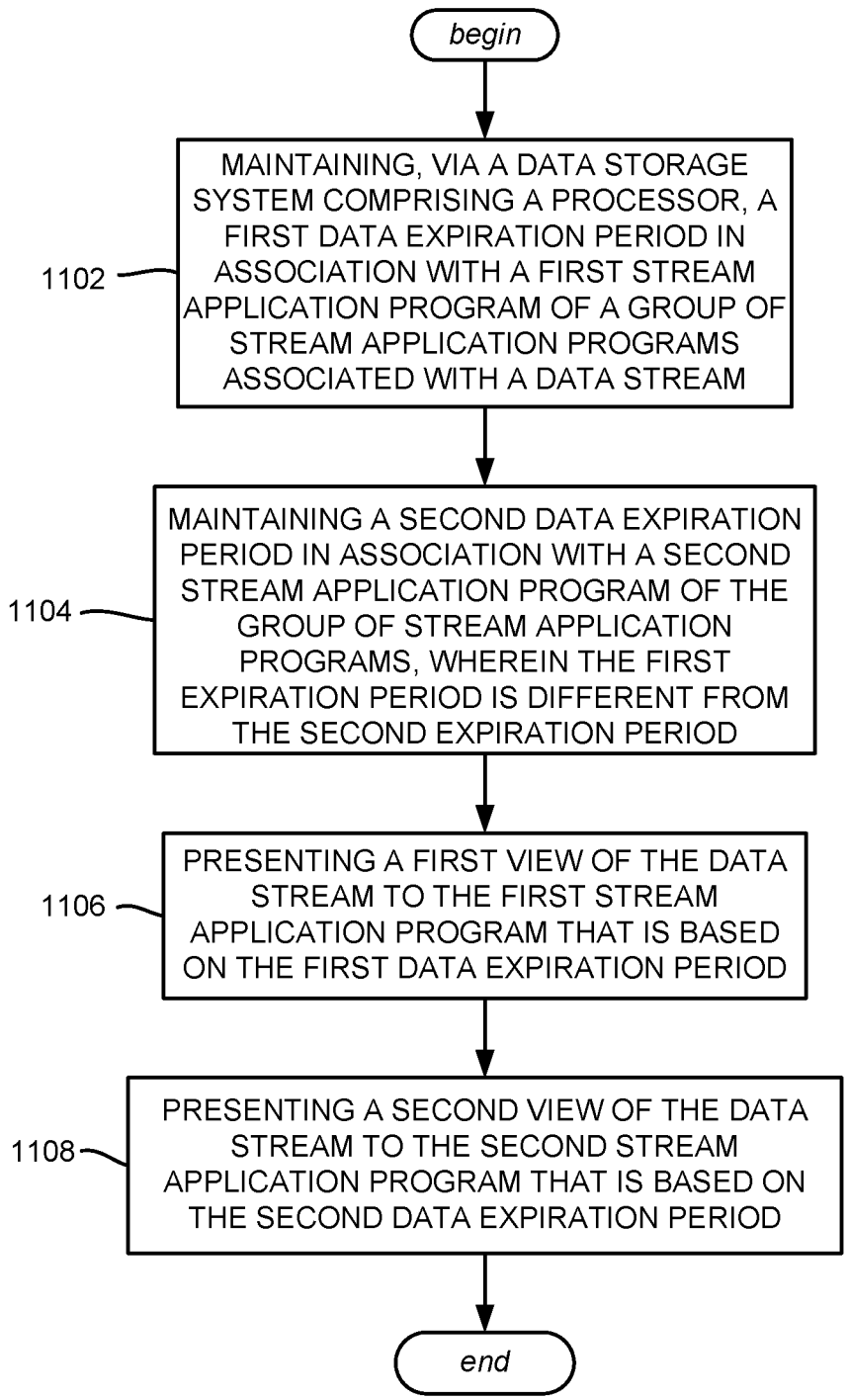
FIG. 11 is an example flow diagram showing example operations related to presenting different views to different applications based on different stream data expiration times for the applications, in accordance with various aspects and implementations of the subject disclosure.

One or more example aspects, such as corresponding to example operations of a method, are represented in FIG. 11. Operation 1102 represents maintaining, via a data storage system comprising a processor, a first data expiration period in association with a first stream application program of a group of stream application programs associated with a data stream. Operation 1104 represents maintaining a second data expiration period in association with a second stream application program of the group of stream application programs, wherein the first data expiration period is different from the second data expiration period. Operation 1106 represents presenting a first view of the data stream to the first stream application program that is based on the first data expiration period. Operation 1108 represents presenting a second view of the data stream to the second stream application program that is based on the second data expiration period.

The first data expiration period can be longer than the second data expiration period, and aspects can comprise truncating the data stream based on the first data expiration period.

The data stream can be truncated based on a selected stream cut of a group of stream cuts associated with the data stream, the first data expiration period can be longer than the second data expiration period, and aspects can comprise determining the selected stream cut, and generating a new stream cut for storage in the group of stream cuts to replace the selected stream cut based on the second data expiration period.

Maintaining the first data expiration period in association with the first stream application program can comprise maintaining first metadata for the first stream application program, and presenting the first view of the data stream to the first stream application program based on the first data expiration period can comprise accessing the first metadata to limit data reads for the first stream application program to be within the first data expiration period.

Figure 12:
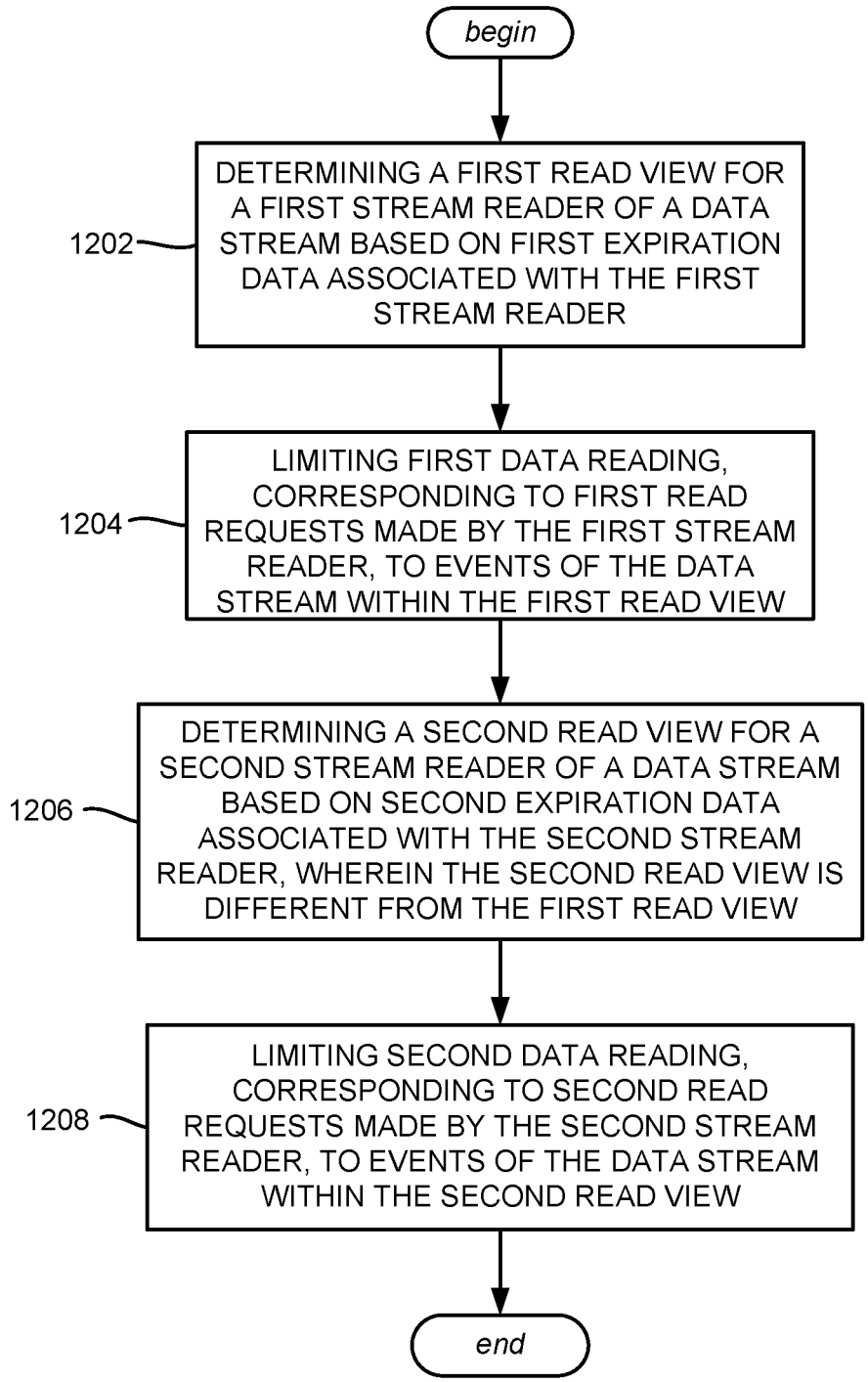
FIG. 12 is an example flow diagram showing example operations related to limiting reading of a data stream by different applications based on different stream expiration data associated with the applications, in accordance with various aspects and implementations of the subject disclosure.

FIG. 12 summarizes various example operations, e.g., corresponding to a machine-readable storage medium, comprising executable instructions that, when executed by a processor of a streaming data storage system, facilitate performance of operations. Operation 1202 represents determining a first read view for a first stream reader of a data stream based on first expiration data associated with the first stream reader. Operation 1204 represents limiting first data reading, corresponding to first read requests made by the first stream reader, to events of the data stream within the first read view. Operation 1206 represents determining a second read view for a second stream reader of a data stream based on second expiration data associated with the second stream reader, wherein the second read view is different from the first read view. Operation 1208 represents limiting second data reading, corresponding to second read requests made by the second stream reader, to events of the data stream within the second read view.

Further operations can comprise truncating the data stream based on the first expiration data. Truncating the data stream based on the first expiration data can use a stream cut that is selected, based on an expiration policy associated with the data stream, from a group of stream cuts associated with the data stream; further operations can comprise generating an updated stream cut, which modifies the stream cut, for storage in the group of stream cuts based on the second expiration data.

The group of stream cuts can be stored in a stream cut data structure, and truncating the data stream can comprise accessing the stream cut data structure to obtain the stream cut.

As can be seen, described herein is a technology that facilitates a data expiration feature of applications, such as for enterprise-level implementations. The technology facilitates automatic and consistent data lifetime management for possibly very different applications that work with one stream. The technology is practical to implement.

Figure 13:
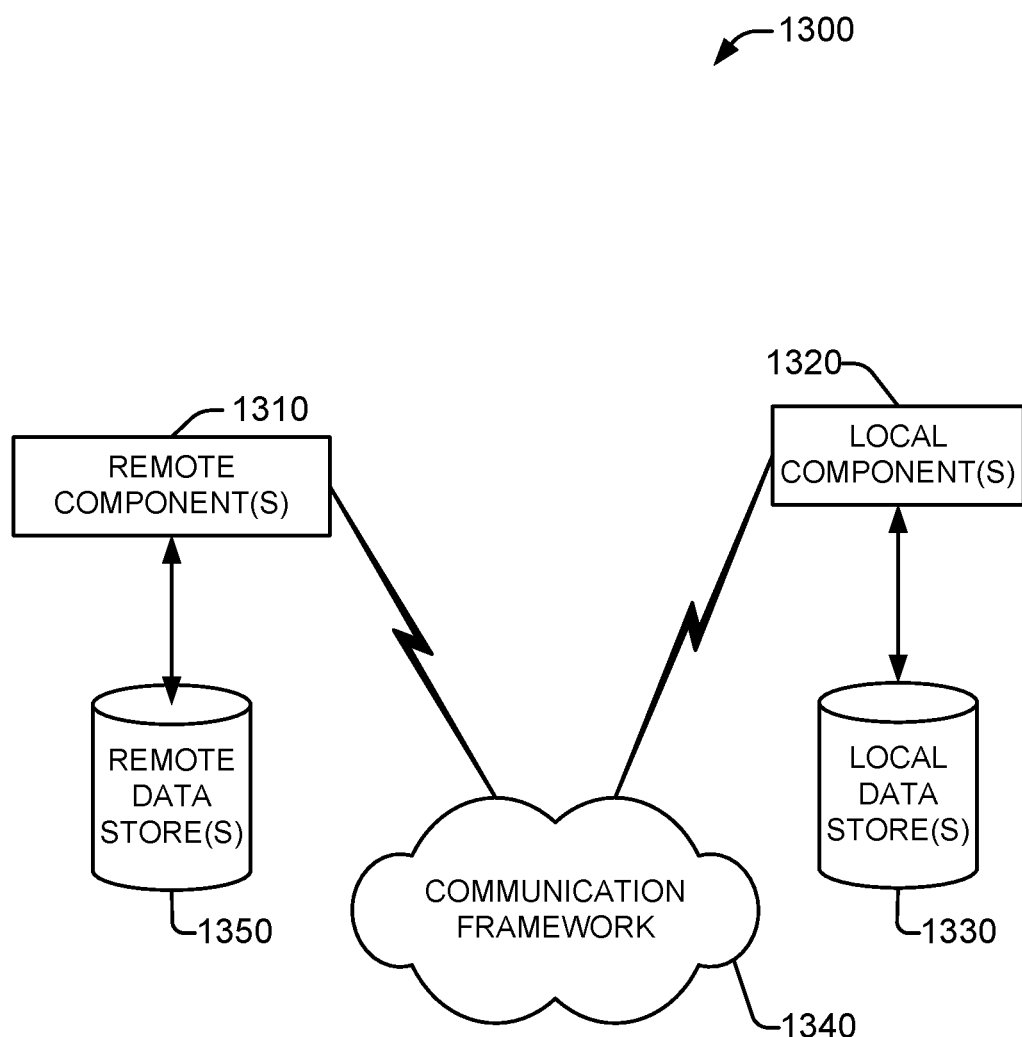
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
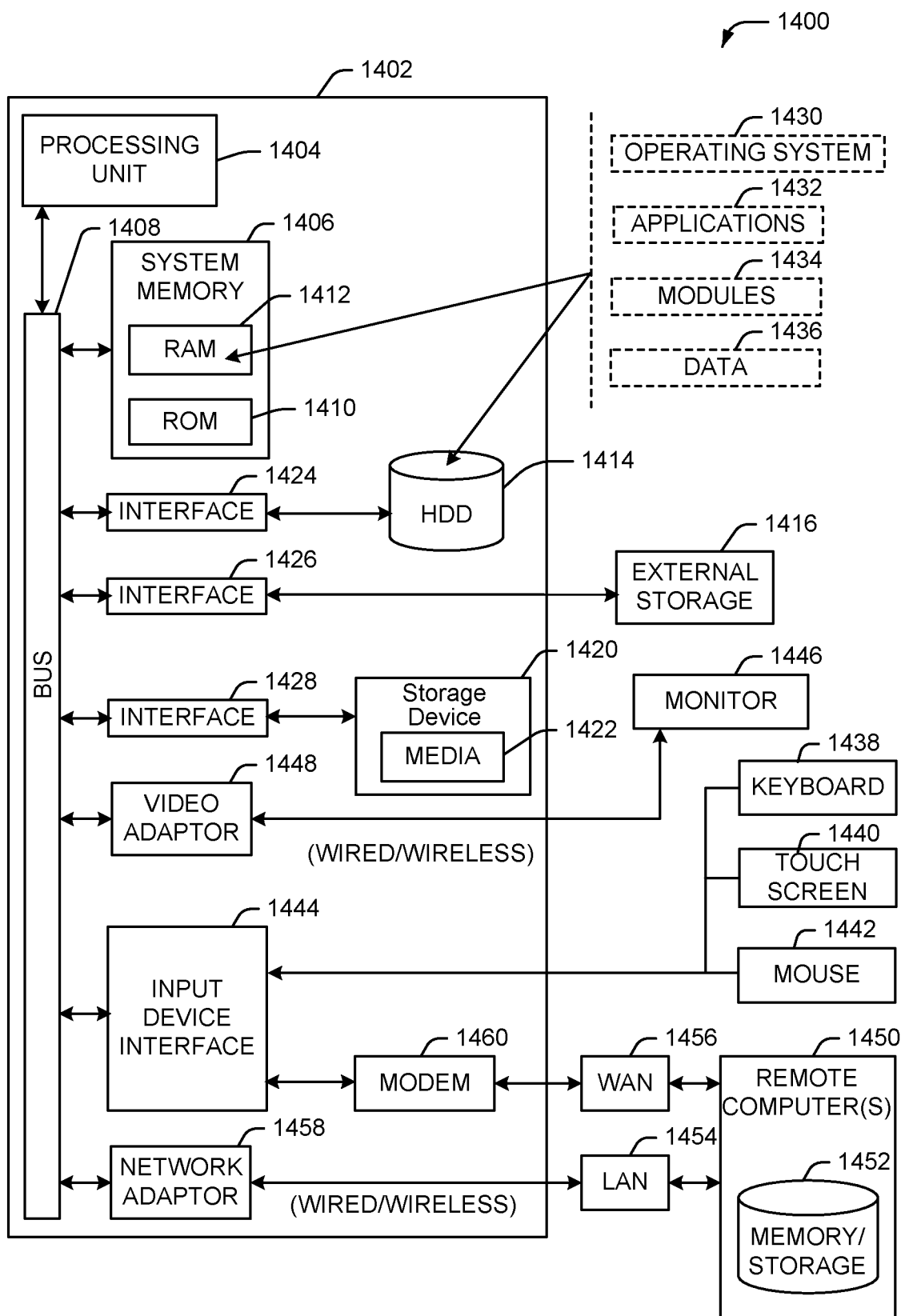
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
maintaining a data stream of a streaming data storage system for stream application programs;
maintaining respective stream data expiration periods respectively associated with the stream application programs and corresponding to respective views of the data stream;
receiving a read request from a stream application program of the stream application programs to read from the data stream, wherein the stream application program is registered to the data stream at a registration time, and wherein a respective stream data expiration period, of the respective stream data expiration periods, associated with the stream application program is established at the registration time;
determining a respective view of the respective views associated with the stream application program, the respective view based on the respective stream data expiration period associated with the stream application program; and
in response to the read request, reading from the data stream comprising limiting the reading to the respective view of the data stream associated with the stream application program.

2. The system of claim 1, wherein the maintaining the data stream comprises truncating the data stream based on a longest data expiration period of one of the stream application programs.

3. The system of claim 2, wherein the truncating the data stream comprises truncating to a stream cut point.

4. The system of claim 3, wherein the operations further comprise determining a frequency of generating stream cut points based on a shortest data expiration period of another one of the stream application programs, other than the one.

5. The system of claim 1, wherein the data stream comprises scaling segments, and wherein the reading from the data stream comprises reading from the scaling segments.

6. The system of claim 1, wherein the stream application program is a first stream application program, wherein the respective view is a first respective view, wherein the read request is a first read request, wherein the respective data expiration data is first respective data expiration data, and wherein the operations further comprise receiving a second read request from a second stream application program of the stream application programs to read from the data stream, determining a second respective view associated with the second stream application program based on second respective data expiration data associated with the second stream application program, and, in response to the second read request, further reading from the data stream comprising limiting the further reading to the second respective view of the data stream associated with the second stream application program.

7. The system of claim 1, wherein the maintaining the respective stream data expiration periods associated with respective stream application programs of the group comprises maintaining respective metadata associated with the stream application programs, respectively.

8. The system of claim 1, wherein the stream application programs are registered to the data stream as readers via a system controller.

9. The system of claim 1, wherein the operations further comprise modifying the respective stream data expiration period associated with the stream application program after the registration time.

10. The system of claim 1, wherein the stream application program has read profile data that specifies a respective type of available read request access to the data stream.

11. The system of claim 10, wherein the read profile data comprises one of: tail and catch-up read access based on a relatively short respective data expiration period according to the respective stream data expiration period being less than or equal to a defined upper period limit, partial historical read access based on a relatively moderate respective data expiration period according to the respective stream data expiration period being within a defined period range from the defined upper period limit to a defined lower period limit, or historical read access based on a relatively long respective data expiration period according to the respective stream data expiration period being greater than or equal to the defined lower period limit.

12. A method, comprising:
maintaining, via a data storage system comprising a processor, a first data expiration period in association with a first stream application program of a group of stream application programs associated with a data stream;
maintaining a second data expiration period in association with a second stream application program of the group of stream application programs, wherein the first data expiration period is different from the second data expiration period;
presenting a first view of the data stream to the first stream application program that is based on the first data expiration period; and
presenting a second view of the data stream to the second stream application program that is based on the second data expiration period, wherein at least one of the first stream application program or the second stream application program is registered to the data stream at a registration time, and wherein at least one of the first data expiration period associated with the first stream application program or the second data expiration period associated with the second stream application program is established at the registration time.

13. The method of claim 12, wherein the first data expiration period is longer than the second data expiration period, and further comprising truncating the data stream based on the first data expiration period.

14. The method of claim 12, wherein the data stream is truncated based on a selected stream cut of a group of stream cuts associated with the data stream, wherein the first data expiration period is longer than the second data expiration period, and further comprising determining the selected stream cut, and generating a new stream cut for storage in the group of stream cuts to replace the selected stream cut based on the second data expiration period.

15. The method of claim 12, wherein the maintaining the first data expiration period in association with the first stream application program comprises maintaining first metadata for the first stream application program, and wherein the presenting the first view of the data stream to the first stream application program based on the first data expiration period comprises accessing the first metadata to limit data reads for the first stream application program to be within the first data expiration period.

16. A non-transitory machine-readable storage medium, comprising executable instructions that, when executed by a processor of a streaming data storage system, facilitate performance of operations, the operations comprising:
determining a first read view for a first stream reader of a data stream based on first expiration data associated with the first stream reader;
limiting first data reading, corresponding to first read requests made by the first stream reader, to events of the data stream within the first read view;
determining a second read view for a second stream reader of a data stream based on second expiration data associated with the second stream reader, wherein the second read view is different from the first read view; and
limiting second data reading, corresponding to second read requests made by the second stream reader, to events of the data stream within the second read view, wherein at least one of the first stream reader or the second stream reader is registered to the data stream at a registration time, and wherein at least one of the first expiration data associated with the first stream reader or the second expiration data associated with the second stream reader is established at the registration time.

17. The non-transitory machine-readable storage medium of claim 16, wherein the operations further comprise truncating the data stream based on the first expiration data.

18. The non-transitory machine-readable storage medium of claim 17, wherein the truncating the data stream based on the first expiration data uses a stream cut that is selected, based on an expiration policy associated with the data stream, from a group of stream cuts associated with the data stream, and wherein the operations further comprise generating an updated stream cut, which modifies the stream cut, for storage in the group of stream cuts based on the second expiration data.

19. The non-transitory machine-readable storage medium of claim 17, wherein the group of stream cuts is stored in a stream cut data structure, and wherein the truncating the data stream comprises accessing the stream cut data structure to obtain the stream cut.

20. The non-transitory machine-readable storage medium of claim 16, wherein the first stream reader has first read profile data that specifies a first type of available read request access to the data stream, and wherein the second stream reader has second read profile data that specifies a second type of available read request access to the data stream.

* * * * *